March 10, 1925. 1,528,800
F. G. THANNHAUSER
MILLING ATTACHMENT
Filed Oct. 16, 1922   5 Sheets-Sheet 1

Inventor:
Fred G. Thannhauser
By
Attorneys

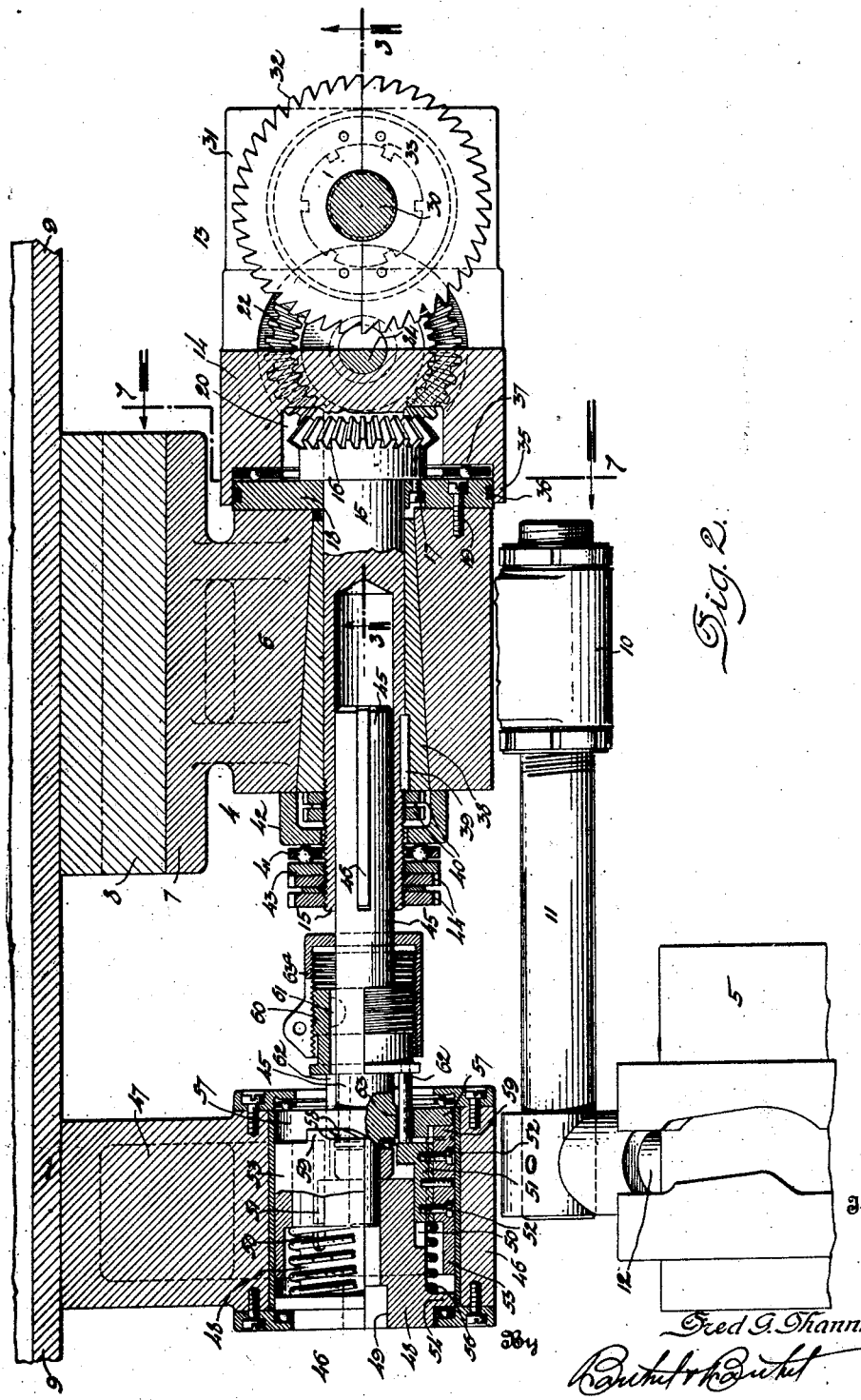

March 10, 1925.  1,528,800

F. G. THANNHAUSER

MILLING ATTACHMENT

Filed Oct. 16, 1922  5 Sheets-Sheet 3

Inventor:
Fred G. Thannhauser

By Rauhut & Rauhut
Attorneys

March 10, 1925.　　　　F. G. THANNHAUSER　　　　1,528,800
MILLING ATTACHMENT
Filed Oct. 16, 1922　　　　5 Sheets-Sheet 4

Inventor:
Fred G. Thannhauser

March 10, 1925.　　　　　　1,528,800

F. G. THANNHAUSER
MILLING ATTACHMENT
Filed Oct. 16, 1922　　　5 Sheets-Sheet 5

Inventor:
Fred G. Thannhauser
By
Attorney

Patented Mar. 10, 1925.

1,528,800

UNITED STATES PATENT OFFICE.

FRED G. THANNHAUSER, OF DETROIT, MICHIGAN, ASSIGNOR OF FOUR-FIFTHS TO DETROIT NUT COMPANY, OF DETROIT, MICHIGAN, A CORPORATION OF MICHIGAN.

MILLING ATTACHMENT.

Application filed October 16, 1922. Serial No. 594,700.

*To all whom it may concern:*

Be it known that I, FRED G. THANN-HAUSER, a citizen of the United States of America, residing at Detroit, in the county of Wayne and State of Michigan, have invented certain new and useful Improvements in Milling Attachments, of which the following is a specification, reference being had therein to the accompanying drawings.

This invention relates to metal working machines and more particularly to a milling attachment for machines provided with a driving spindle and arranged to support and rotate the work in axial alignment with the spindle.

An object of the invention is to index around or shift a tool carried by and rotated with the spindle, relative to the work and during the simultaneous and continuous rotation of the spindle and work.

It is also an object to provide a tool carrying attachment applicable as a unit to the spindle of a machine of the character described, to turn with said spindle and through such turning movement to effect the rotation of said tool relative to the spindle.

A further object is to provide an attachment for machines of the character described and which attachment is particularly adapted for milling in the work, a plurality of slots in angular relation to each other, and to provide a simple and conveniently applied attachment having other objects in view.

The invention consists in the provision of a simple and efficient device for the purpose by means of which the several enumerated and other objects are attained, and in the matters hereinafter set forth and more particularly pointed out in the appended claims, reference being had to the accompanying drawings, in which—

Fig. 2 is a longitudinal section through a device illustrative of the invention, with several parts of the device shown partly in elevation and partly broken away to more clearly disclose the construction;

Figure 1:
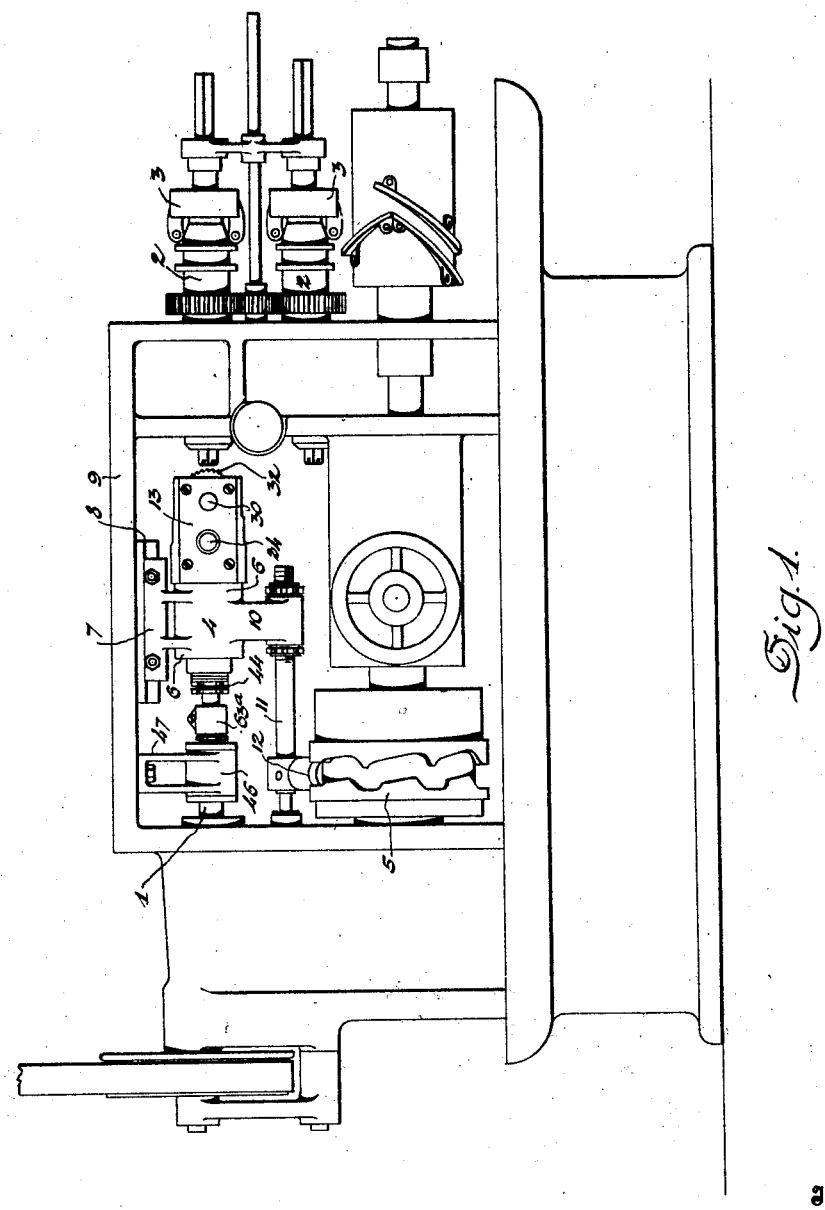
Figure 1 is a side elevation of a machine shown diagrammatically or mainly in outline and illustrating the application thereto of a device embodying the invention.
Figure 6:
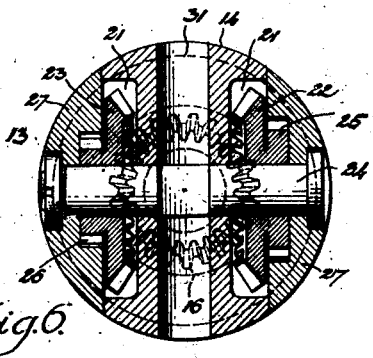
Fig. 6 is a transverse section substantially upon the line 6—6 of Fig. 3.
Figure 5:
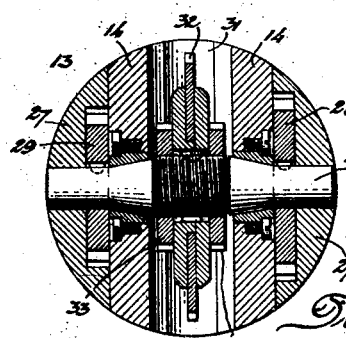
Fig. 5 is a transverse section substantially upon the line 5—5 of Fig. 3.
Figure 3:
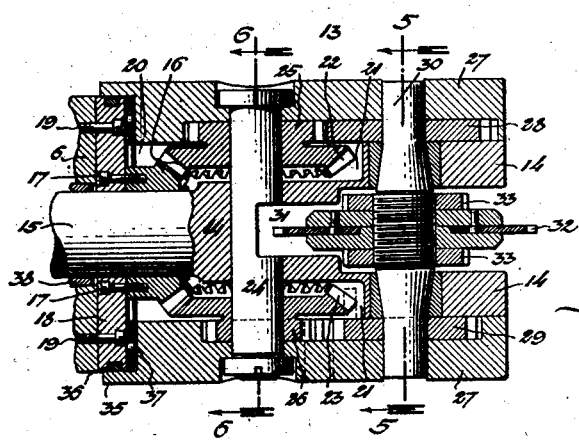
Fig. 3 is a longitudinal section through a tool carrying head, said section being substantially upon the line 3—3 of Fig. 2.
Figure 4:
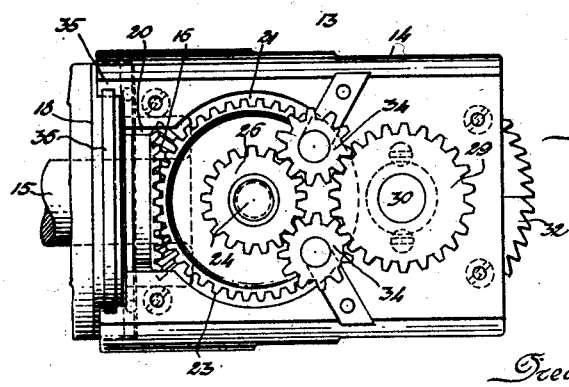
Fig. 4 is a side elevation of Fig. 3 with a side cover plate of the device removed.
Figure 7:
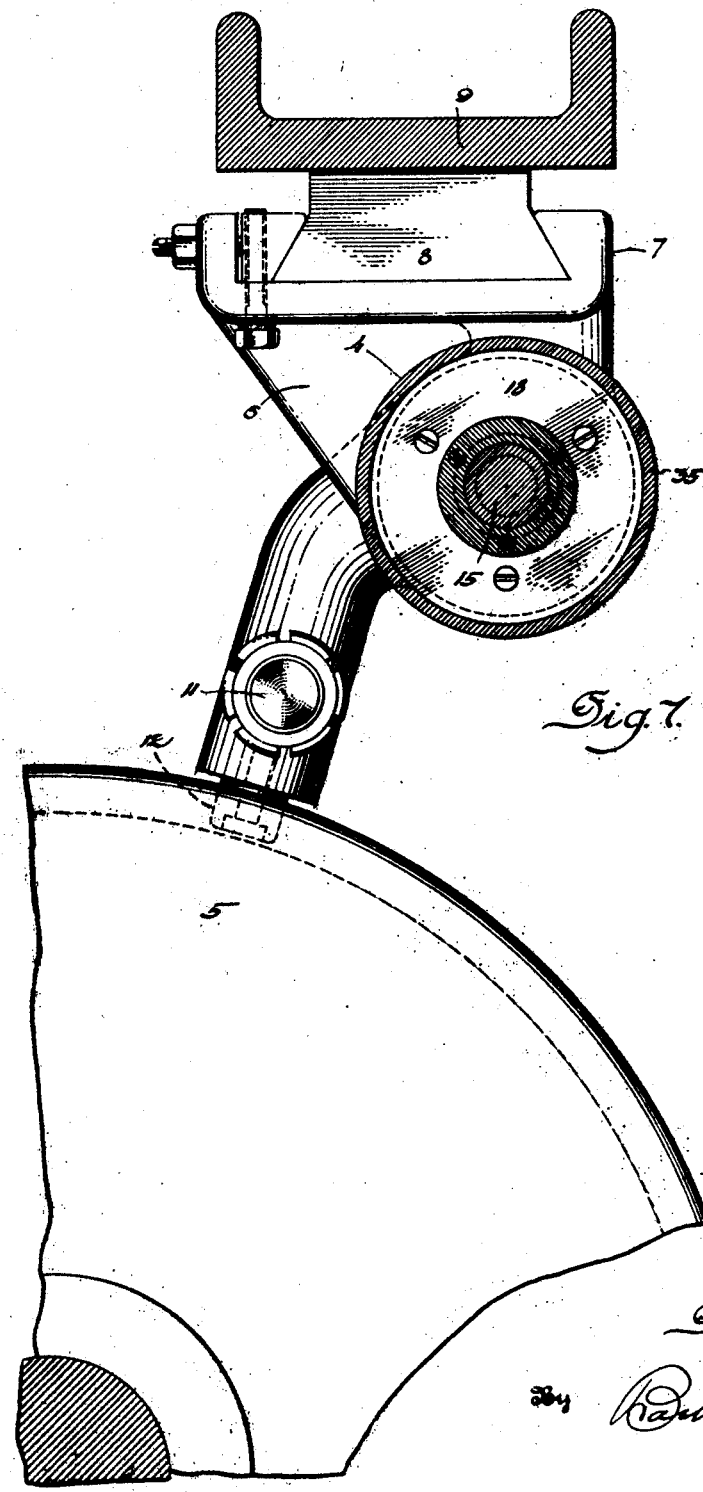
Fig. 7 is a transverse section substantially upon the line 7—7 of Fig. 2.
Figure 8:
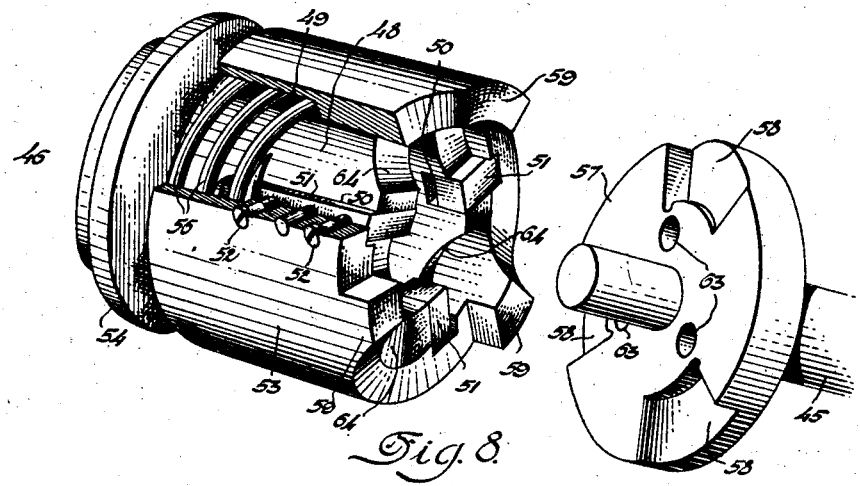
Fig. 8 is a perspective detail of an indexing head with parts broken away and in section to more clearly disclose the construction and parts separated and set out in perspective.
Figure 9:
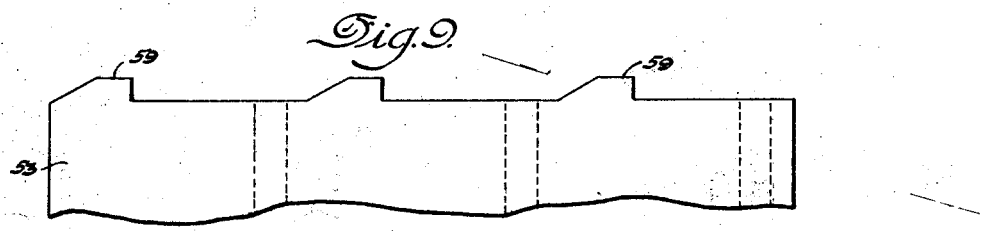
Fig. 9 is a developed plan view of an outer sleeve of the indexing head.
Figure 10:
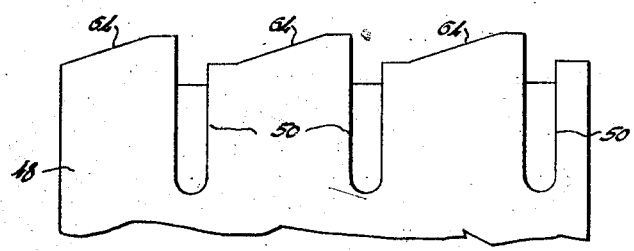
Fig. 10 is a developed view of an inner sleeve of the indexing head.

In Fig. 1 of the drawing the device or attachment embodying the invention is shown as applied to a screw machine of a particular type but it will be understood that said attachment may be applied as well to other types of machines wherein is embodied a driving spindle and a work spindle arranged in axial alignment with the drive spindle, to turn simultaneously therewith, the particular type of machine outlined in Fig. 1 of the drawing, being a machine known as a "Gridley multiple-spindle automatic screw machine." It is obvious however that the present invention may be applied to an automatic or semi-automatic machine of the horizontal or vertical type in which the driving and work spindles are in axial alignment and simultaneously rotated. In the "Gridley multiple spindle automatic screw machine" outlined in Fig. 1 of the drawings, said machine is provided with a driving spindle 1 and a plurality of work carrying spindles 2, each provided with a chuck 3 for holding the work and all arranged to rotate upon their own axes simultaneously with the rotation of the driving spindle and to be intermittently rotated about one common axis to bring each chuck carried by each spindle successively into longitudinal axial alignment with the driving spindle.

The attachment embodying the present invention is indicated as a whole in Fig. 1 by the numeral 4, and this attachment embodies a tool carrying head which is operatively connected with the driving spindle 1 to rotate therewith, being guided and supported in suitable guides and bearing supports, and moved longitudinally in timed relation to its rotation and the operation of the work spindles, by means of a suitable rotatable cam 5.

The attachment indicated in Fig. 1 by the numeral 4, comprises a bearing member 6 having a dove-tail slide 7 operatively engaged with an undercut tool guide or way 8 secured in any suitable manner to the cross member 9 of the frame of the automatic screw machine. Extending downwardly from the bearing member 6 is an arm 10, and adjustably attached to this arm, is a rod 11 provided with a roll 12 adapted to engage within the cam groove of the cam 5 for the purpose of moving the attachment longitudinally of the tool guide 8 during the rotation of the cam.

A tool-carrying head, indicated as a whole by the numeral 13 and shown in detail in Figs. 2 to 6 inclusive, is carried by one end of the bearing member 6 and comprises a spider or frame 14 formed with an integral axial shaft 15 upon which shaft is sleeved a bevel gear 16, said bevel gear being securely held against rotation with the shaft 15 or relative thereto, by means of screws or pins 17 passing through a disk 18 which is detachably secured to the end of the bearing member 6 by means of studs or screws 19. The bearing member 6 being non-rotatable and the disk 18 being rigidly secured thereto with the gear 16 rigidly secured to the disk 18, said gear 16 is rigidly held against rotation, but the shaft 15 is free to rotate therein, and the frame or spider 14 which is an integral part of the shaft rotates therewith about the gear 16, said frame or spider being formed with an end recess 20 to receive the gear. Said spider 14 is also formed with side recesses 21 to receive beveled gears 22 and 23 meshing with the gear 16 at opposite sides thereof. These beveled gears 22 and 23 are mounted to turn freely upon a pin 24 passing transversely through the head and having a bearing in the frame or spider 14 between these gears.

Secured to or formed integral with the gear 22 is a spur gear 25 and a similar spur gear 26 of less diameter than the gear 25 is secured to or formed integral with the bevel gear 23. Side plates 27 are secured in any suitable manner to the sides of the spider or frame 14 and form a part of this frame when secured in place thereon, to provide a structure of substantially cylindrical form, and these plates 27 are recessed at their inner sides to receive the gears 25 and 26 and also spur gears 28 and 29 which are secured upon a transverse tool arbor 30 having bearings in the spider 14 and also in the side plates 27, said arbor extending across a slot 31 formed in the spider 14, longitudinally thereof and cutting transversely therethrough, said slot being provided to receive a rotatable milling cutter 32 which is secured in any suitable manner, as by jam nuts 33, upon an enlarged and screwthreaded intermediate portion of the arbor 30, said saw being split transversely or formed in two parts to facilitate its removal from its arbor and thus obviate the necessity for removing the arbor from the head. The spur gear 28 is in mesh with the spur gear 25 to transmit motion from the beveled pinion 16 through the beveled gear 22 and spur gear 25 to one end of the arbor 30. In order that motion may be transmitted to the opposite end of the arbor to turn the same in a like direction, idler gears 34 are interposed between the spur gear 26 and the spur gear 29 within the recessed inner side of the plate 27, and therefore, motion is transmitted from the beveled pinion 16 through the gear 23, spur gear 26, and idlers 34, to the spur gear 29 to rotate the same in the same direction and at the same speed as the gear 28 and thus transmit turning power to both ends of the arbor 30 and drive the milling tool 32 carried thereby, which tool, as shown in the drawings, is a metal slotting saw for cutting slots or grooves in the work.

As illustrative of a use to which this invention may be put, the device is shown as applied to an automatic screw machine which is set up to form nuts and at one of the stations of the multiple work carrying spindles, the attachment embodying the invention is positioned to slot or castellate the partially formed nut. Castellated nuts as usually formed are slotted transversely with the slots extending across the end of the nut in angular relation midway of the several facets of the nut and in order that the tool or cutter for milling these slots may cut through the axis of the nut transversely thereof, it is necessary that the tool which is preferably in the form of a circular cutter or saw, be positioned with its axis of rotation at right angles to the axis of the nut and with the cutting edge of the cutter in the plane of this axis. In order that the stock from which the nut is made may be continuously rotated while the end of the stock is being slotted, it is necessary that the tool or cutter be also rotated upon an axis coincident with the axis of rotation of the stock and in timed relation to such rotation. Further, it is necessary that the tool be advanced and retracted toward and from the stock in timed relation to its rotation and the rotation of the stock and also where more than one slot is to be formed in the end of the stock, that the tool be indexed around or its position shifted relative to the stock to form two or more slots in the end of the stock with these slots in angular relation to each other. In the present device, therefore, the milling cutter or saw 32 is positioned in the head 13 with the plane of the saw extending longitudinally of and in the plane of the axis of rotation of the head. Therefore, when the head 13 is advanced or moved longitudinally, as previously described, by means of the cam 5 which operates to move the carrier 6 along its supporting slide 8, the tool is brought into engagement with the end of the stock projecting from the chuck 3 and a slot is formed transversely of the stock, after which the cam will again operate to retract the head 13 and move the cutting tool out of the slot. As the driving spindle 1 and the work spindle 2 which carries the chuck 3 are both continuously rotated at the same speed, and as the head 13 through its connection with the spindle 1, as hereinafter described, is also rotated with the driving spindle and at the same speed, the cutting tool is permitted to engage the stock and cut the slot therein while both stock and head 13 are rotating. It is however necessary in order to cut the slot, that the tool 32 be at the same time rotated upon its own axis which is transverse to the axis of rotation of the head 13, and to effect such rotation by means of power which rotates the head, or the power transmitted from the driving spindle 1 through the shaft 15, the gear 16 is made non-rotatable or is held against rotation by means of the screws 17, as previously described, which rigidly secure the gear to the disk 18 which, in turn, is rigidly secured to the end of the bearing member 6. As the spider or frame 14 is an integral part of the shaft 15, this carrying frame or spider must necessarily turn with the shaft 15 and as the gearing which transmits motion from the fixed gear 16 to the saw arbor 30, is carried by the head, said gearing is carried around the axis of the head and as the beveled gears 22 and 23 are in mesh with the fixed gear 16, they will be rotated upon their own axes by such engagement with the fixed gear, and thus transmit a rotary motion to the tool 32. For compactness and symmetry of arrangement, and also for the purpose of enclosing the gears and housing the tool, the cover plates 27 are secured to the sides of the spider 14 and with said spider form a cylindrical head which is chambered to receive the several gears and is provided with suitable bearings for the pin 24 and arbor 30, and as the tool or saw is positioned within a longitudinal slot in this head, which slot cuts through the head transversely, the tool is also housed in the head with a portion only of its periphery projecting beyond the end of the head a sufficient distance to engage the work and cut the desired depth of the slot therein. The chambered head comprising the spider 14 and plates 27 also provides lubricant retaining chambers, and, as shown in Fig. 2, the inner end of the head may be provided with a flange 35 to project over the periphery of the disk 18 with a packing ring 36 interposed between the edge of the disk and the flange to form a tight joint. If found desirable, a thrust bearing 37 may be interposed between the end of the head and the face of the disk 18 to take the end thrust of the head when the device is advanced to bring the tool into engagement with the work and to eliminate friction so that the head will turn freely relative to the disk and bearing member 6.

As the shaft 15 carries the head 13 and must also rotate freely within the bearing 6, a tapered bushing 38 is preferably provided between the shaft and bearing surface of the bearing 6 and this bushing is secured to the shaft by means of a key 39 to turn therewith but is free for adjustment longitudinally of the shaft to compensate for wear, such longitudinal adjustment of the bushing being accomplished by means of the adjusting nuts 40 engaging the externally screw-threaded outer end of the shaft and bearing against the end of the bushing. End play of the shaft within its bushing is prevented by means of a thrust bearing 41 engaging the end of a cup member 42 sleeved upon the projecting end of the shaft with one end engaging the adjacent end of the bearing 6 and its opposite end engaged by the thrust bearing, end play of the shaft being taken up by providing a disk 43 to engage the opposite side of the thrust bearing 41 and which disk is adjusted and held by means of suitable adjusting nuts 44 engaging the screwthreaded end of the shaft.

In order that a driving connection may be maintained with the shaft 15 during the reciprocation of the bearing member 6 and head 13 carried thereby, said shaft 15 is preferably bored longitudinally to receive therein the end of a power transmitting shaft 45 and in order to cause the shafts 15 and 45 to turn together and at the same time permit of a free relative longitudinal movement of these shafts, the shaft 45 is provided with a longitudinal key or spline 46 to engage a key-way in the shaft 15.

As previously pointed out, where a plurality of slots in angular relation to each other, are to be milled in the end of the work, it is necessary that mechanism be provided for indexing around or turning the milling tool 32 relative to the work after each operation of forming a slot therein, and to perform this indexing operation in timed relation to the rotation and reciprocation of the tool, indexing mechanism is interposed between the driving spindle 1 and the shaft 45, said indexing mechanism being contained within a head indicated as a whole by the numeral 46 and which head is mounted in a bracket 47 secured to the frame member 9 of the machine.

This indexing head comprises a socket member or inner sleeve 48 which is formed with a socket 49 to receive the end of the driving spindle 1, the socket and end of the spindle being formed to provide driving relation between the spindle and socket member to cause them to turn together. The socket member 48 is also formed with peripheral grooves 50 to receive keys 51 which keys are secured by screws or studs 52 to an outer sleeve member 53, said keys being adapted to slide longitudinally within the grooves 50 in the inner socket member or sleeve 48 and cause the outer and inner members to rotate together. Interposed between a flange 54 on the inner member and the end of the outer member or sleeve 53, is a coiled spring 56 which exerts a force to normally hold the outer sleeve projected toward and in engagement with a disk or head 57 formed integral with the end of the shaft 45, said disk or head 57 being also formed with peripheral notches 58 to be engaged by projections 59 on the end of the outer sleeve member 53. As the inner member 48 and outer member 53 are connected to turn together by means of the keys 51, and as the outer member is normally held with its projections 59 engaging the notches 58 in the head 57 of the driven shaft 45, driving motion is transmitted from the spindle 1 through said inner and outer members and head 57 to the shaft 45 and through said shaft to the shaft 15 which carries and rotates the tool head 13. A detachable driving connection between the spindle 1 and the tool head is therefore provided and this driving connection may be broken by forcing the outer sleeve member 53 to move longitudinally against the action of the spring 56, away from the disk 57 and thus disengage its projections 59 from the notches 58 in said disk. Upon such disengagement the shaft 45 and thus the tool head 13 driven thereby, may change its position relative to the driving spindle and permit of the indexing movement of the tool relative to the work.

To effect the disengagement of the outer sleeve 53 from the head 57, a sleeve 60 is attached to the shaft 45 to turn therewith and to move longitudinally thereon, by means of a suitable key 61 and this sleeve carries pins 62 which extend parallel with the shaft 45 from the end of the sleeve through a series of openings 63 in the disk or head 57. The over-all length of the sleeve 60 is varied by providing a sleeve 63ª having screw threaded engagement with the sleeve 60 so that one sleeve may be adjusted longitudinally, relative to the other and thus vary the distance between the end of the sleeve 63ª and the end of the shaft 15, which shaft is moved endwise by the reciprocation of the head 6 on its guideway, and upon the retraction of the head 6, the end of the shaft 15 is brought into engagement with the sleeve 63ª and moves said sleeve, projecting the pins 62 through the openings in the head 57 into engagement with the keys 51 and through such engagement, moving the outer member 53 of the indexing mechanism against the action of the spring 56 to disengage its projections 59 from the notches 58 in the head 57. The retraction of the bearing member 6 and the tool carrying head 13 carried thereby, thus operates the sleeve 53 to release it from engagement with the head 57 and permits relative movement between the indexing head and the shaft 45. Immediately upon the release of the sleeve 53 from the head 57, the entire mechanism including the head 57, shaft 45, and shaft 15 with its tool carrying head 13, to which mechanism rotative movement is imparted from the sleeve 53, will lag behind the speed of rotation of the sleeve which sleeve 53 is positively driven from the driving spindle, and thus carry the pins 62 out of engagement with the inwardly projecting ends of the keys 51 with which they have been engaged by the retraction of the tool carrying head 13, and upon such disengagement of the pins with the keys, the spring 56 will at once move the sleeve 53 toward the head 57 to engage the projections 59 thereon with the next succeeding notches 58, rearwardly in the direction of rotation, thus indexing the tool carrying head 13 around, the distance between the notches 58, so that the tool will, upon the next advance of the head by means of the cam 5, bring the tool 32 into contact with the end of the work in a new position to form a second slot in the work at an angle to the first slot formed. To positively move the sleeve 60 longitudinally of the shaft 45 and thus withdraw the pins 62 out of the path of the next succeeding keys 51, said pins are forced outwardly in their openings in the head 57 by means of cam surfaces 64 formed on the end surface of the inner sleeve 48, said pins sliding up their cam surfaces upon relative turning movement of the head 57 and inner sleeve 48, thus positively forcing the pins 62 out of the path of the next succeeding keys and moving the sleeve 60 along the shaft to a position where it will again operate, upon the retraction of the tool carrying head, to engage the pins with their next succeeding keys, rearwardly in the direction of rotation and release the outer sleeve 53 from driving connection with the head 57 on the shaft 45.

By this arrangement, each time that the tool carrying head is retracted by the cam 5, the driven spindle will be released from driving engagement with the power transmitting shaft 45 and the tool or cutter carried by the tool head 13 will be indexed around one position, determined by the position of the notches 58, relative to the work which is carried by one of the work spindles 2 and which spindle is being positively driven at the same rate of speed at which the driving spindle 1 is rotating.

The attachment embodying the invention is therefore operated by a single driving spindle to rotate the cutting tool upon its own axis and to also cause an intermittent indexing around of this tool relative to the work after the cutting of each groove in the end of the work. The device is therefore particularly adaptable for use in connection with automatic screw machines for forming slots in the end of the work carried by the several work spindles and other milling operations, such as forming a polygonal end on the work, and to form a plurality of these slots or facets in angular relation to each other, such as in the forming or castellating of nuts, the castellating operation being performed while the work carrying spindle is positioned in axial alignment with the driving spindle, and after the slotting or castellating operation is completed the machine will operate to carry the work around to the next station or position of the work spindle head where other operations may be applied to other forms of machines having a driving and work spindle rotated in common and arranged in axial alignment so that a slot may be milled in the work while the work is being rotated and turning or other forming operations are being performed either at the same or other stations in the rotation of the work spindle head, such as in the making of a fillester head screw or the like, thus obviating the necessity for stopping the rotation of the work during the slotting or milling operation. An attachment which is very compact in construction and which is readily applicable to the driving spindle of a machine of this character, is provided and the mechanism embodied within the attachment is adapted to be operated by motion imparted thereto by the driving spindle. The operation of castellating nuts and other milling operations are greatly facilitated by the use of this attachment and a device is provided which is simple in construction and efficient in operation.

Obviously changes may be made in the form and construction of the attachment to adapt it to the particular machine to which it is desired to apply it and to the work to be performed and other changes which may be made within the scope of the appended claims are contemplated.

What I claim is:—

1. A device of the character described applicable for use in connection with concurrently rotated driving and work carrying spindles, said device including a rotary milling tool arranged to cut a slot transversely of the end of work carried by said work spindle and at the axis of rotation of said work, a tool carrying head for connection with said driving spindle to turn therewith and upon which said tool is mounted to turn therewith and to rotate upon an axis extending substantially at right angles to the axis of rotation of said head, and means housed within said head for translating the rotary motion of said head, to rotate said tool upon said transverse axis.

2. A device of the character described applicable for use in connection with concurrently rotated driving and work spindles, including a tool carried by the work spindle, means for transmitting motion from said driving spindle to rotate said tool upon an axis coincident with the axis of rotation of said spindles and upon an axis transverse thereto, and means for shifting the position of said tool about the longitudinal axis of said spindle relative to the work during its rotation upon both axes.

3. A device of the character described applicable for use in connection with concurrently rotated driving and work spindles, including a tool, means for transmitting motion from said driving spindle to rotate said tool upon an axis coincident with the axis of rotation of said spindles and upon an axis transverse thereto, and means for indexing said tool rotatively upon said spindle axis to change the position of said tool relative to the work.

4. A device of the character described applicable for use in connection with concurrently rotated driving and work spindles, including a tool for milling the projecting end portion of work carried by the work spindle, means for transmitting motion from said driving spindle to rotate said tool upon an axis coincident with the axis of rotation of said spindles and upon an axis transverse thereto, means for advancing and retracting said tool toward and from the work, and indexing means operative during the retraction of said tool for shifting the position of said tool relative to the work.

5. A device of the character described applicable for use in connection with concurrently rotated driving and work spindles, including a tool for milling work carried by the work spindle, means for transmitting motion from said driving spindle to rotate said tool upon an axis coincident with the axis of rotation of said spindles and upon an axis transverse thereto, means for advancing and retracting said tool toward and from the work, and means operative in timed relation to said advancing and retracting means for changing rotatively, the position of said tool relative to the work.

6. A device of the character described applicable for use in connection with concurrently rotated driving and work spindles, including a tool for milling work carried by the work spindle, means driven by the driving spindle upon which said tool is mounted for rotation therewith, means for advancing and retracting said tool toward and from the work, means driven by the rotation of said means upon which the tool is mounted for rotating said tool upon an axis transverse to the spindle axis, and means for breaking the driving connection between said driving spindle and said means upon which the tool is mounted, to permit of a relative turning movement of said tool and work to index the tool around relative to the work during the simultaneous rotation of said tool and work upon a common axis.

7. A device of the character described applicable for use in connection with concurrently rotated driving and work spindles, including a tool for milling work carried by the work spindle, a rotatable head upon which said tool is mounted to rotate therewith and upon an axis transverse to the axis of rotation of said head, means within said head for translating the rotary motion of said head to rotate said tool upon its axis which is transverse to the axis of rotation of the head, and connecting and disconnecting means between said head and said driving spindle, operated to effect disconnection of said head from said driving spindle, by a movement of said head longitudinally of its axis of rotation.

8. A device of the character described applicable for use in connection with concurrently rotated driving and work spindles including a tool carrying head, a tool mounted upon said head to turn therewith upon an axis coincident with the spindle axis and to turn upon an axis transverse to the axis of rotation of the head, means for rotating said tool upon its axis transverse to the axis of rotation of the head and concurrently with the rotation of said head, carrying means upon which said tool carrying head is mounted to turn freely, means for imparting a reciprocatory movement to said carrying means to advance and retract the tool toward and from the work carried by the work spindle, and means operative in timed relation to the reciprocation of said carrying means for indexing said head rotatively and relative to the work during the simultaneous rotation of said head and work.

9. A device of the character described for co-operation with a driving spindle and a simultaneously rotated work carrying spindle, said device including a tool carrying head, carrying means for said head and upon which said head is free to rotate upon an axis coincident with said spindle axes, a tool mounted upon said head to rotate therewith and upon an axis transverse to the axis of rotation of the head, means within the head for translating the rotary motion of said head to rotate said tool upon its axis which is transverse to the axis of rotation of the head, means for reciprocating the head carrying means longitudinally of the axis of rotation of the head to advance and retract the head and tool carried thereby toward and from the work carried by the work spindle and during the rotation of said head and tool, and indexing means for connecting said driving spindle and said head and including means operated by the retraction of said head for operating said indexing means.

10. A device of the character described for co-operation with a driving spindle and a simultaneously rotated work carrying spindle, said device including a tool carrying head, carrying means for said head and upon which said head is free to rotate upon an axis coincident with said spindle axis, a tool mounted upon said head to rotate therewith and upon an axis transverse to the axis of rotation of the head, means within the head for translating the rotary motion of said head to rotate said tool upon its axis which is transverse to the axis of rotation of the head, means for reciprocating the head carrying means longitudinally of the axis of rotation of the head to advance and retract the head and tool carried thereby toward and from the work carried by the work spindle and during the rotation of said head and tool, and an indexing head for transmitting motion from said driving spindle to said tool carrying head, said indexing head including engageable members adapted to be disengaged by the retraction of said tool carrying head to disconnect the tool carrying head from said driving spindle and permit a rotative shifting movement of said tool carrying head relative to work carried by the work spindle and during the simultaneous rotation of said head and work.

11. An attachment for a metal working machine having a driving spindle and a work carrying spindle arranged in axial alignment and simultaneously rotated, said attachment including a carrying member reciprocatable longitudinally of the axis of rotation of said spindles, a tool carrying head carried by said carrying member and rotatable thereon upon an axis coincident with the axis of rotation of said spindles, a tool mounted within a slot in said head to turn therewith and to turn upon an axis transverse to the axis of rotation of said head, means operatively connecting said driving spindle and said head to transmit motion from said spindle to drive the head, and gearing within the head including a stationary gear for rotating said tool upon its axis transverse to the axis of rotation of the head and during such rotation of the head.

12. An attachment for a metal working machine having a driving spindle and a simultaneously rotated work carrying spindle, said attachment including a carrying member, a tool carrying head carried by and freely rotatable upon said carrying member, said head having a longitudinal slot extending inwardly from the end thereof adjacent the work spindle, an arbor on the head extending transversely thereof and of said slot, a rotary milling cutter mounted upon said arbor within said slot and projecting therefrom at the end of the head, gearing housed within the head and including a non-rotative gear secured to said carrying member, and means for transmitting motion from said driving spindle to rotate said tool carrying head.

In testimony whereof I affix my signature in presence of two witnesses.

FRED G. THANNHAUSER.

Witnesses:
    LEWIS E. FLANDERS,
    KARL H. BUTLER.